BRIDGES ET AL 3,544,890
S FOR DETECTING DAMAGE IN TURBINE
R MAGNETIC CHARACTERISTICS
led July 17, 1968

INVENTORS
JACK E. BRIDGES
HENRY R. HEGNER

D. James Bader
ATTY.

3,544,890
METHOD AND APPARATUS FOR DETECTING DAMAGE IN TURBINE BLADES BY THEIR MAGNETIC CHARACTERISTICS

Jack E. Bridges, Park Ridge, and Henry R. Hegner, Park Forest, Ill., assignors to IIT Research Institute, Chicago, Ill., a not-for-profit Illinois corporation
Filed July 17, 1968, Ser. No. 745,629
Int. Cl. G01r 33/00
U.S. Cl. 324—34                                 7 Claims

ABSTRACT OF THE DISCLOSURE

A system for the detection of foreign object damage in the blades of a turbomachine. The blades are preferably made of magnetic material and the flux or magnetic field emanating from each blade is detected by a transducer as the blade passes. Damaged blades are demagnetized and do not produce the same flux pattern through the transducer as they pass.

---

This invention relates generally to novel means and methods for detecting foreign object damage to the blades of a turbomachine while the machine is in operation. More particularly it relates to the detection of flaws caused by the ingestion of foreign objects into a turbomachine having blades of magnetic material.

For purposes of this application the term turbomachine will be used as one of general application. It relates to hydraulic machines having vanes or blades in which the fluid has a velocity relative to the vane or blades. Typical examples of such devices are jet engines, centrifugal and axial flow pumps and compressors. The inventive concept disclosed herein is not limited in its use to any particular type of turbomachine. It finds particular application in the monitoring of rotor blades in the compressor section of jet engines while in flight so that blade damage is detected prior to destruction of the engine. Since the system disclosed herein is of general usefulness on all turbomachines the use of the terms turbine, engine or machine will be treated as interchangeable with turbomachine.

The blades of a typical turbomachine rotor are moving at a high rotational speed and are subjected to severe stresses by fluid flow as well as centrifugal force in normal operation. In addition, certain environmental conditions provide hazards for blade damage. Examples of these hazardous conditions are the ingestion of foreign objects into the jet engine and the impingement of dirt or rock particles on the blades of a pump during operation. The present invention makes it possible to detect damage to the blades of a high speed turbine while it is operational whether in flight or on the ground. The detection of damage to a blade is immediate and provides sufficient warning for shutdown of the turbomachine prior to complete failure of the blade or blades involved.

It is known in the art of magnetic materials that a particular piece of magnetic material can be demagnetized by subjecting it to extreme conditions of physical shock or temperatures. The present system takes advantage of this phenomena and detects the demagnetized blades in the turbine while at operational speed.

The principal object of the present invention is to provide a system and method for detecting damage to blades in a turbomachine.

A further object of the present invention is to detect damage caused by foreign objects ingested into the compressor section of the jet engine.

Still a further object of the invention is to detect foreign object damage to the blades of a compressor of a turbine which blades are made of magnetized material.

These and other objects of the present invention will be more clearly understood with reference to the preferred embodiments and the following detailed description in connection with the drawings wherein.

Figure 1:
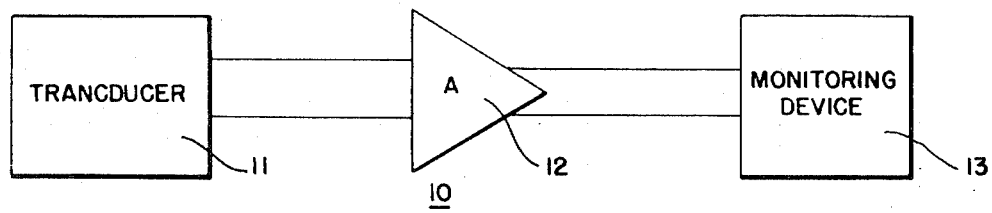
FIG. 1 is a schematic of the basic detection system.
Figure 2:
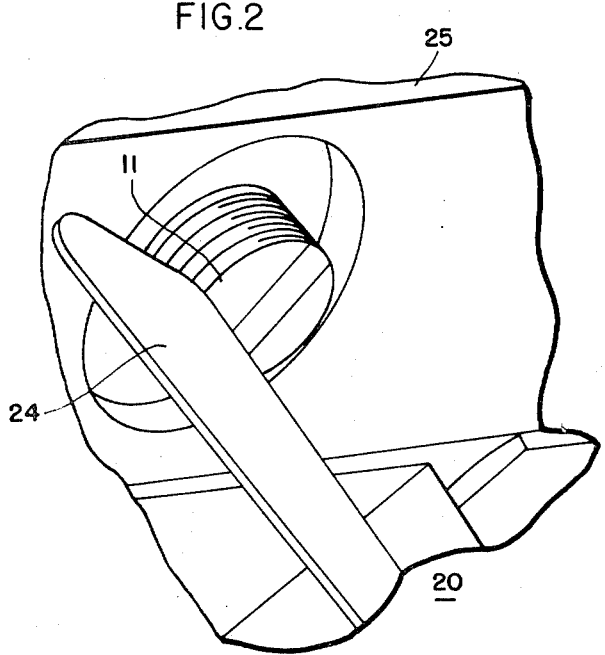
FIG. 2 is a perspective view of one embodiment of the invention mounted in a turbine.

Briefly, FIG. 1 teaches a preferred embodiment of the invention. The system 10 shown in FIG. 1 is made up of detecting means 11 for intercepting and detecting magnetic flux. The detecting means are connected to an amplifier 12 which is in turn connected to a monitoring device 13. The detecting means 11 is preferably a transducer capable of detecting either magnetic flux or change in magnetic flux density and converting the same to an electrical signal. Suitable transducers take the form of Hall-effect devices or transducers made of magnetic material with a coil wound upon them. The transducer 11 is positioned in a housing 25 of a turbomachine 20 as shown in FIG. 2. It is positioned over a row of compressor blades 24 so that each blade in the row will pass directly in front of the transducer. The blades 24 are made of magnetized material. As each blade passes under the transducer the magnetic flux lines are intercepted by the transducer causing a signal to be relayed to the monitoring device 13. If the blade has been demagnetized fewer flux lines will be intercepted by the transducer and therefore a smaller signal will be amplified to the monitoring device 13.

Figure 3:
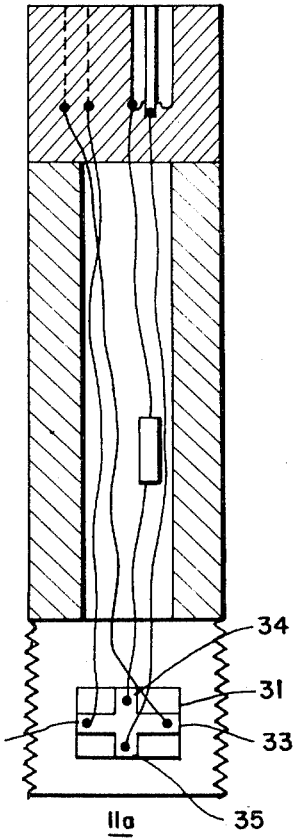
FIG. 3 is a sectional view of one embodiment of a transducer which might be employed in the system of FIG. 1.

As described briefly above a system 10 shown in FIG. 1 includes detecting means in the form of a transducer 11. One preferred embodiment of the construction of such a transducer is shown in FIG. 3. In this embodiment the transducer 11a is made up of a standard Hall-effect device 31 having two connections 32 and 33 for DC bias and two connections 34 and 35 in a known manner to be used as pick-off points to transmit detected signals to the remainder of the system. The transducer 11a thus gives a measurement of the intensity of the magnetic field impinging on the Hall-effect device as each blade passes the transducer. The DC bias is the only active source connected to the transducer 11a.

The Hall-effect device shown in FIG. 3 is oriented perpendicular to the wall of the engine housing. This orientation is satisfactory for applications where the housing is made of nonmagnetic material. If a magnetizable housing is employed the Hall-effect device would be mounted parallel to the wall and just inside the housing to avoid the effects of magnetic shielding.

Figure 4:
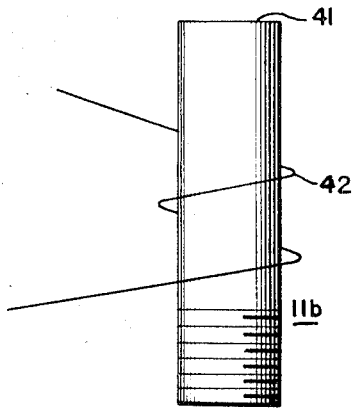
FIG. 4 is an elevational view of another embodiment of the transducer.

Another embodiment of transducer that falls within the scope of this invention is shown in FIG. 4. The transducer 11b of this embodiment is made up of a magnetic core 41 and a coil 42 wound on the core. The opposite ends of coil 42 are connected into the remainder of the system shown in FIG. 1. The connections on the coil for this embodiment are passive connections. No active source is necessary for this type of transducer to function. Transducer 11b shown in FIG. 4 provides a reading of the rate of change of the intensity of the magnetic field caused by the passing of each magnetized blade 24. Although the transducer shown in FIG. 4 is in the form of a magnetic rod it could also take any other geometric form without departing from the scope of the invention.

FIG. 2 shows a perspective view of a transducer of the present invention mounted in a typical turbine. In the embodiment shown a hole has been drilled in the housing 25 of the turbine 20. Transducer is then placed directly above the tips of the first row of blades 24 in the compressor section. This row of blades is the one most subject to foreign object damage and would constitute in most cases adequate protection against destruction of the engine. It is possible however to place transducers over more than one row of blades in a single engine. Tests show that transducers positioned over the first three rows of rotor blades in the compressor section of a jet engine will detect over eighty percent of all foreign object damage. It is also possible to place the transducer outside the engine housing or only part way through the housing if the housing is not made of magnetic material. Most jet engine housings today are aluminum or other nonmagnetic material.

The present invention may be better understood by reference to the operation of the detection device. A turbomachine having blades made of magnetizable material is a necessary prerequisite to the operation of the system. The blades made of magnetizable material are magnetized by some known method such as induction. The material is preferably capable of retaining remnant magnetization for a period of time of the order of weeks. Remagnetization may be necessary from time to time. The particular magnetic orientation of the blade is not critical so long as each blade is magentically oriented in the same direction. One orientation used provides magnetic poles at the tip and root of each blade, however, the magnetic orientation of the blades could also be from edge to edge. A magnetic transducer such as that shown in FIG. 4 is then placed directly over the magnetized row of blades. A coil is wound onto the transducer and in a preferred embodiment the opposing ends of the coil are fixed to an amplifier or amplifier circuit. The amplifier is in turn connected to the monitoring device as described previously.

Each blade in the row possesses a remnant magnetization of approximately equal strength. The remnant magnetization causes a magnetic field in the vicinity of each blade. If a magnetic transducer such as the one shown in FIG. 4 is employed each passing blade will cause a rapid change in the flux or field intensity immediately adjacent to the transducer tip. The magnetic transducer then reacts to the changing magnetic field and produces a signal in the coil by induction. A signal picked up from the passing blade is transmitted to an amplifier schematically shown as 12 in FIG. 1. After the signal is amplified it is transmitted to the monitoring device 13 shown in FIG. 1. In its simplest form the monitoring device might be an oscilloscope in which case the signals from the undamaged blades would appear as peaks on the display. If the blades are all made of the same material and are all magnetized there will be one peak on the display for each blade on the rotating portion of the turbomachine.

When a foreign object strikes one of the blades the magnetization of the blade is destroyed or significantly altered. The result of demagnetizing a blade by striking it appears on the display as a missing or greatly reduced peak in the pattern which can be related to a particular blade.

It has been found that a relatively small amount of damage to a blade can produce demagnetization. The present system is sensitive enough to detect damage to the blades of a jet engine where the diameter of the flaw is of the order of 0.015 inch. The distortion of the peak caused by the blade becomes progressively more pronounced until flaws reach diameters of the order of 0.10 inch. A flaw of 0.10 inch causes total demagnetization of the blade. Yet a 0.10 inch flaw is not of a size sufficient to cause immediate disintegration of the blade. A warning is provided long before a crack propagates from the flaw through the blade. The result is a clear and simple system for detecting minor damage to turbine blades caused by any type of a blow such as a foreign object long before the damage is serious enough to cause disintegration of the turbine. If a Hall-effect transducer is employed the operation of the system is essentially the same except that the transducer measures the flux intensity rather than the rate of change of flux intensity.

The Hall-effect type of transducer which measures the magnitude of the magnetic field is more suitable for detection of magnetic blades passing at low speeds. The magnetic transducer described above is more suitable for high speed rotation since it measures the rate of change of magnetic field rather than the absolute magnitude. The system of the present invention can be employed without amplifier or monitoring device. For example, the signal from a damaged blade might cause automatic shut-down of the engine. It is also possible to use more elaborate circuitry than the simple amplifier 12 and to provide an alarm system in place of the monitoring device 13 so that when a plane is in flight the alarm would sound automatically when there is an indication of blade damage.

The system disclosed herein could also have the transducer mounted on a strut prior to the first row of compressor blades. The transducer would then detect the field distortion caused by rotor blades from the edge of each blade rather than from the tip. While this configuration functions in an acceptable manner it is not the preferred approach. Positioning the transducer over the tip of the blades provides more stable mounting and more rugged construction.

An alternative embodiment of the invention disclosed herein is a portable unit including a movable probe transducer and monitoring device. This embodiment is valuable for flight line check outs or for periodic monitoring of any turbomachine which is not encased in a magnetizable housing. The probe is positioned over each row of blades outside the housing.

While preferred embodiments have been shown in the drawings and described herein these embodiments are not intended to cover all modifications and alternative constructions coming within the sphere and scope of the invention as defined in the appended claims.

We claim as our invention:

1. A turbomachine comprising a housing, a rotor and a stator, said rotor and said stator each having relatively movable rows of blades cooperating to form a compressor section for the intake and compression of a fluid, at least one row of said blades on said rotor being made entirely of magnetized material,
 transducer means mounted in said housing radially outside said one row of blades for detecting the magnetic field of each magnetized blade and for producing a signal in response thereto, and
 monitoring means connected to said transducer means for observing the signals produced by each passing blade and the lack of signal indicative of demagnetization of a blade due to damage from ingestion of a foreign object into said compressor section.

2. The system defined in claim 1, wherein said transducer means comprises a magnetic core and coil.

3. The system defined in claim 1, wherein said transducer means comprises a Hall-effect device.

4. A method for detecting blade damage in a turbomachine having a rotor and stator comprising the steps of,
 magnetizing the blades in at least one row of said turbomachine rotor,
 rotating said turbomachine rotor,
 detecting the magnetic field produced by each blade as it passes a fixed point, and observing the results of said detecting whereby demagnetized blades may be located.

5. The method defined in claim 4, wherein said detecting the magnetic field includes measuring the intensity of said magnetic field.

6. The method defined in claim 4, wherein detecting said magnetic field includes measuring the time rate of change of the magnetic field intensity at said fixed point.

7. A method for detecting blade damage in a turbomachine comprising the steps of, magnetizing all blades in at least one row of said turbomachine rotor, positioning a transducer over said row of blades to intercept the magnetic field created by each blade and convert said magnetic field to a signal, transmitting each of said signals to a monitoring device whereby the demagnetization of any blade may be observed while said turbomachine is rotating at operational speed.

References Cited

UNITED STATES PATENTS

| | | | |
|---|---|---|---|
| 2,575,710 | 11/1951 | Hardigg | 324—340X |
| 2,805,677 | 9/1957 | Baird | 324—34X |
| 3,317,829 | 5/1967 | Kuhrt et al. | 324—45X |

ALFRED E. SMITH, Primary Examiner

U.S. Cl. X.R.

73—70